United States Patent Office 3,227,691
Patented Jan. 4, 1966

3,227,691
PROCESS FOR THE PRODUCTION OF EUPOLY-OXYMETHYLENES
Jürgen Behrends, Hanau (Main), and Otto Schweitzer, Konigstein, Taunus, Germany, assignors to Deutsche Gold- und Silber-Scheideanstalt vormals Roessler, Frankfurt am Main, Germany
No Drawing. Filed Apr. 15, 1963, Ser. No. 272,876
Claims priority, application Germany, May 31, 1958, D 28,223
6 Claims. (Cl. 260—67)

This application is a continuation-in-part of application Serial No. 815,280, filed May 25, 1959.

The present invention relates to the production of eupolyoxymethylenes.

The term eupolyoxymethylenes is used herein to designate high molecular weight addition polymers of formaldehyde, which, in contrast to other polymers of formaldehyde which have been known to date, are distinguished by their increased resistance to heat and in addition by their adaptability to the production of tough and relatively heat resistant plastic bodies by the method of molding under pressure and increased temperature, by injection molding techniques and by other processes known to the art for the shaping of high polymeric bodies. (In this regard, compare Staudinger, "The High Molecular Organic Compounds," Springer Publishing House, Berlin, 1932, pages 255–262, and Walker, "Formaldehyde," Reinhold Publishing Corp., New York, 1944.)

The object of this invention then is to produce high molecular weight addition polymers of formaldehyde which exhibit a much higher degree of heat stability than exhibited by the eupolyoxymethylene known heretofore.

Eupolyoxymethylenes have been produced in various ways. Among the techniques which can be employed for this purpose, there is, for example, the polymerization of monomeric formaldehyde in an inert liquid medium in the absence of water and in the presence of dispersion agents and polymerization catalysts such as aliphatic or aromatic amines (H. Staudinger and W. Kern, "The High Molecular Organic Compounds," 1932, pages 280–287). Other catalysts, for this purpose, which are known in the art are the trialkyl arsines, the trialkyl stibines or the trialkyl phosphines. It is also known that formaldehyde can be polymerized, at lower temperatures, in solvents in the presence of sulfuric acid or boron trichloride. The art is also aware of the technique of so conducting the polymerization that, before the polymerization of the major portion of the formaldehyde, a smaller portion is first polymerized, which is then separated together with the impurities that may eventually be present.

Those eupolyoxymethylenes which are produced by the techniques known to the art to date and the articles that are manufactured from them have only a relatively limited resistance to heat. The hot molding of such eupolyoxymethylenes, as is customarily done with other polymerizates, cannot be carried out at all or only with poor results due to the resulting splitting off of formaldehyde that occurs at the higher temperatures. A relatively high portion of the polymer will split off as monomeric formaldehyde at about 200° C.

It is also known that eupolyoxymethylenes can be produced from formaldehyde in the pressure of compounds having the general formula $R_nM$ in which M is a metal such as copper or aluminum and R is a thiohydrocarbon radical.

Furthermore, it has also been known to stabilize polymeric formaldehydes by mixing them with urea or its derivatives.

It has now been found that eupolyoxymethylenes, which have a much greater resistance to heat, can be produced if the polymerization of the water free monomeric formaldehyde is conducted in the presence of a sulfur compound of the formula,

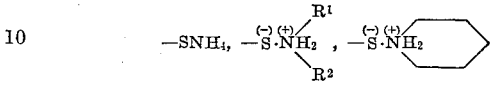

in which X is a radical selected from the group consisting of

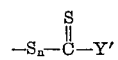

and

in which $n$ is an integer of 1 to 4 and Y and Y' are nitrogen containing radicals selected from the group consisting of

and

in whcih $R^1$ and $R^2$ are selected from the group consisting of lower alkyl, lower cycloalkyl and aryl and $R^3$ is an alkylene radical of up to 5 carbon atoms as the sole polymerization catalyst, said sulfur compound being suspended in the form of extremely fine particles in an inert liquid in a quantity of 0.01 to 0.03% by weight of said inert liquid. Examples of such compounds are thiuram disulfide, tetramethylthiuram disulfide, tetramethylthiuram tetrasulfide, dipentamethylenethiuram tetrasulfide, dimethyl diphenyl thiuram disulfide, cyclohexylethyl ammonium-cyclohexylethyl dithiocarbamate, the piperidine salt of pentamethylene dithiocarbamic acid, ammonium dithiocarbamate and tetramethylthiuram monosulfide.

Preferably, tetramethylthiuram disulfide or the piperidine salts of pentamethylene dithiocarbamic acid are employed in this process.

In addition, it has also been found that the effectiveness of these catalytic compounds can be increased, if the polymerization is carried out in the presence of molecular oxygen. To this end it is advantageous to use molecular oxygen in admixture with an inert gas, such as nitrogen. This gaseous mixture should contain less than 5% oxygen in order to avoid the formation of an explosive mixture.

The above enumerated sulfur compounds can be advantageously employed in the form of a suspension in an inert solvent, for example, gasoline. Further improvements in the results can also be obtained if the particle size of the suspended sulfur compounds is made as small as possible and the percent of sulfur compounds in suspension is maintained between 0.01 and 0.03% by weight in relation to the weight of the reaction medium. In this regard it is preferable to use a gasoline that has a boiling range of 100 to 140° C.

An addition to paraformaldehyde, α-polyoxymethylenes, lower and higher molecular weight formaldehyde polymers and trioxane, preferably highly purified trioxane can also be employed for the production of the monomeric formaldehyde employed as a starting material.

The production of the eupolyoxymethylenes according to the invention is expediently carried out by injecting monomeric formaldehyde, preferably at room temperature and in the presence of molecular oxygen, into a most finely divided colloidal suspension possible of one of the above mentioned sulfur compounds in gasoline. The eupolyoxymethylenes precipitate out from this suspension in a white, loose, flocculent form and can be shaped, after drying, by the usual procedures. To this end, before the shaping or molding, it is advantageous to granulate the finely divided polymer product. If necessary, whatever sulfur compounds are still adhering to the polymerizates at this point can be rinsed out with suitable solvents such as methanol, ethanol, propanol, isopropanol, butanol, acetone, ethylene trichloride, carbon tetrachloride and carbon disulfide.

The eupolyoxymethylenes produced by the process according to this invention can be processed by the customarily used thermoplastic processes for the making of formed articles, for example, by injection molding pressing, and so forth; or they can be used for the coating of objects. If desired, this inventive process can also be conducted in the presence of such customarily employed substances as polymerization regulators including alcohols, anhydrides, and so forth; plasticizers including dioctyl phthalate, dibutyl phthalate, dioctyl adipate, glycols such as propylene glycol, and so forth; stabilizers including urea, its derivatives and substitute products, hydrazine, its derivatives and substitute products, phenols, and so forth. These substances favorably influence the workability of the eupolyoxymethylenes and/or the stability, and/or the mechanical properties of the articles formed from these eupolyoxymethylenes. The formed articles thus produced are distinguished in that they have a marked resistance to heat.

In addition, fillers and/or coloring agents can also be used in combination with the eupolyoxymethylenes. Among such materials are, in particular, glass fibers and mineral wool.

Special advantages can be realized if use is made of finely divided, especially active reenforcing fillers, for example, carbon black, preferably alkaline carbon black, or oxides of metals or metalloids, such as aluminum oxide, titanium oxide, zirconium oxide or silicon dioxide, which were obtained by reacting volatilized compounds of these materials at higher temperatures in an oxidizing or hydrolyzing medium.

It has furthermore been found advantageous according to the invention if a high initial concentration of the monomer is employed. This facilitates the initiation of the reaction. The same effect can also be obtained if the catalyst is first introduced after the gasoline has been saturated with the monomeric formaldehyde.

The production of these eupolyoxymethylenes, according to this invention can also be carried out as a continuous operation. In this instance, the unreacted monomeric formaldehyde and the resulting oligomeric polymers after a prior splitting of the oligomeric polymers into the monomer are expediently recycled. The uniform dispersion of the fine particle sized catalysts is carried out by the usual techniques employed by the polymerization act.

The following table illustrates the resistance to heat exhibited by some of the eupolyoxymethylenes produced by the process according to the invention.

All the tests recorded in the table were conducted in the presence of molecular oxygen. In addition, in test 1, the gasoline used had been previously saturated with air for two hours. The table also shows in relation to tests 4 and 5 the resulting increase in temperature that occurred during the polymerization process.

The following examples will serve to illustrate a number of embodiments of the process according to the invention.

Example 1

30 grams of paraformaldehyde were suspended in 100 ml. of paraffin oil. The suspension was then heated to 140° C., so that the paraformaldehyde decomposed within 60 minutes, while introducing a 1:1 air-nitrogen mixture. The resulting gas mixture was conducted through two traps that were cooled to −20° C. and then into a suspension of 0.1 gram of tetramethyl thiuram disulfide in 400 ml. of gasoline. At the beginning of the reaction the temperature of the suspension was about 22° C. After 5 minutes, however, the temperature rose to 34° C., whereupon the solvent medium became turbid. After a few more minutes the polymeric formaldehyde precipitated out. After the completion of the polymerization reaction the precipitated polymer was filtered off on a suction filter, washed with methanol and dried. The polymerizate is pure white, flaky and loose. Based on the amount of paraformaldehyde originally used, the yield of the polymer was 30%. In addition, 8 grams of oligomeric polymer were recovered from the cooling traps.

Example 2

200 grams of paraformaldehyde, suspended in about 200 ml. of paraffin oil, were slowly heated to 100–190° C. concurrent with the introduction of a dry stream of air, in such a manner that the paraformeldehyde was decomposed by the time 2–2.5 liters of air had been introduced. The mixture of formaldehyde, oxygen and nitrogen, after having been purified by cooling to −15° C., was continuously passed into a suspension of 500 mg. of tetramethylthiuram disulfide in 2.5 l. of gasoline. The temperature of the reaction medium rose from about 22° C. to about 44° C. When the polymerization reaction had been completed, which was indicated by the complete pyrolysis of the paraformaldehyde, the eupolyoxymethylene, which had separated out in thick flakes, was removed by suction and dried. The polymer yield amounted to 35–40% in reference to the initial quantity of paraformaldehyde.

Example 3

2 grams of tetraethylthiuram disulfide were suspended in 7 liters of gasoline (B.P. 100–140° C.) and anhydrous monomeric formaldehyde gas was continuously passed into the suspension at room temperature over a period of 6.5 hours. The temperature rose to 36° C. and there was a continuous precipitation of the eupolyoxymethylene formed as a white flocculent mass. 266 grams of a eupolyoxymethylene, which had good heat resistant qualities, were recovered after the precipitate was removed on a suction filter, washed and dried.

TABLE

| Test | Sulfur Compound Used as Catalyst | Percent Loss in Weight Resulting from Heating the Polymer at 200° C. for— | | | | Increase in Temperature that occurred during the polymerization reaction, degrees | Yield, percent |
| --- | --- | --- | --- | --- | --- | --- | --- |
| | | 5 min. | 10 min. | 15 min. | 20 min. | | |
| 1 | Tetramethylthiuram disulfide | 0.58 | 4.00 | 6.4 | 7.96 | | |
| 2 | ___do___ | 1.45 | 4.59 | 7.43 | 10.65 | | |
| 3 | ___do___ | 2.06 | 4.02 | 6.74 | 7.28 | | |
| 4 | Piperidine salt of pentamethylene dithiocarbamic acid | | | | 13.87 | 22–32 | 41.8 |
| 5 | ___do___ | | | | 15.03 | 18–33 | 46.7 |

Example 4

A continuous stream of anhydrous formaldehyde gas was passed for three hours into a suspension of 2 grams of tetramethylthiuram disulfide in 9 liters of gasoline (boiling range 100–140° C.). While the temperature of the medium rose slowly from 14° C. to 36° C. the resulting formaldehyde polymer continuously precipitated out as a snow white flocculent mass. 200 grams of this polymer were recovered, which when subjected for 20 minutes to temperatures of 200° C., only suffered a loss through vaporization of 13.3%.

Example 5

11 liters of gasoline (B.P. 100–140° C.) were saturated for 20 minutes at 12.5° C. with dry formaldehyde gas. At the first sign of turbidity, 2 grams of tetramethylthiuram disulfide, which had been suspended in a small quantity of gasoline, were poured at once into the reaction medium. With that, the temperature quickly rose to 40.5° C. and during the subsequent continuous 5 hour introduction of dry monomeric formaldehyde, eupolyoxymethylene constantly precipitated out as a snow white, flocculent mass. It was found that after the usual washing and drying, 325 grams of the polymer, having good heat stability, had been produced.

Example 6

For 1.5 hours anhydrous monomeric formaldehyde gas was passed into a solution of 500 mg. of tetramethylthiuram disulfide in 2.3 kg. of ethylene trichloride. Thereupon, the temperature in the reaction vessel quickly rose 23° C. to 49° C. and 113 g. of snow white eupolyoxymethylene precipitated in the form of solid flakes. Its heat stability qualities were good.

Example 7

A continuous stream of dry, anhydrous formaldehyde gas was passed into a solution of 0.4 gram of tetramethylthiuram disulfide in 2 kg. of ethylene trichloride for 1.5 hours. As a result of which, 148 grams of eupolyoxymethylene were polymerized and precipitated out as a white, loose, powder which had good heat stability qualities and flowability at 200° C. The temperature, during the reaction, rose from 18° C. to 52° C.

Example 8

A solution of 1 gram of the piperidine salt of pentamethylene dithiocarbamic acid in 9 l. of gasoline at 20° C. which had been saturated with formaldehyde, served as the polymerization medium for a stream of dry monomeric formaldehyde which was continuously introduced therein for 7 hours. The high molecular weight eupolyoxymethylene polymer precipitated out as a snow white flocculent mass which was in turn filtered off, washed with gasoline and dried out in the air. The yield was 295 grams. After being subjected to temperatures of 200° C. for 20 minutes the polymer showed a loss in weight through evaporation of only 16.2%.

Example 9

500 mg. of the piperidine salt of pentamethylene dithiocarbamic acid were dissolved in 1.8 l. of formaldehyde saturated gasoline and a uniform stream of formaldehyde gas was passed for 1 hour into such solution. The formaldehyde gas employed was produced by pyrolysis of 200 grams of paraformaldehyde and was purified by being passed through 2 cooling traps maintained at −20° C. A slow stream of air served as a carrier gas for the formaldehyde gas. The temperature during the reaction rose from 19° C. to 32° C. and the reaction product was a light, flaky eupolyoxymethylene which had very good heat stability qualities. It could be pressed, at a pressure of 100 kg./cm.$^2$, into a tough, transparent and crack resistant film.

Example 10

For 2.5 hours a steady flow of monomeric and extremely anhydrous formaldehyde was passed into a suspension of 500 mg. of the piperidine salt of pentamethylene dithiocarbamic acid in 2.3 l. of absolute anhydrous gasoline. The temperature in the reaction vessel rose quickly from 24° C. to 42° C. during the course of the formation of the high molecular weight formaldehyde polymers. After the usual recovery steps 70.5 grams of a snow white, loose polymer powder were recovered.

Example 11

Formaldehyde gas, which had been produced by pyrolysis of 200 grams of paraformaldehyde and purified by being passed through several cooling traps maintained at −20° C. and then mixed with air which served as a carrier gas, was passed into 2 l. of gasoline (B.P. 100–140° C.) in a continuous stream. 500 mg. of dipentamethylene thiuram tetrasulfide were used as a catalyst. During the rapid polymerization the temperature rose from 24° C. to 43° C. and 83 grams of a light and flocculent eupolyoxymethylene precipitated out. The product exhibited good heat stability qualities and when subjected to a pressure of 100 kg./cm.$^2$ formed an elastic, tough film.

Example 12

Dry formaldehyde gas was passed into a solution of 500 mg. of cyclohexylethyl ammonium-cyclohexylethyl dithiocarbamate in 1.5 l. of gasoline for 2.5 hours. 57.5 grams of eupolyoxymethylene were produced. The resulting polymer, after being removed by suction, washed and dried, was pressed into a transparent, tough film.

Example 13

Upon passage, for 2 hours, of a continuous stream of dry, monomeric formaldehyde into a suspension of 0.4 gram dimethyl-diphenyl thiuram disulfide in 2.5 l. of dry gasoline, 63 grams of a flaky eupolyoxymethylene was produced which exhibited a good thermal stability. The temperature during the polymerization rose from 22° C. to 40° C.

Example 14

400 mg. of tetramethylthiuram monosulfide were introduced into 1.8 l. of gasoline (B.P. 100–140° C.) and into this reagent in turn, dry monomeric formaldehyde was introduced in a steady stream for 30 minutes. While the temperature in the reaction vessel rose from 23° C. to 30° C., 16.5 grams of a flaky, high molecular weight polymer of formaldehyde precipitated out. After being removed by suction, washed and dried the polymer was heated for 20 minutes at 200° C. and showed a loss through evaporation of only 10.6%.

Example 15

50 mg. of the piperidine salt of pentamethylene dithiocarbamic acid were charged into 2 l. of formaldehyde saturated gasoline. Monomeric formaldehyde was then introduced, for 30 minutes, into this reaction medium. The formaldehyde was mixed with a little nitrogen which acted as a carrier gas. In this way 31 grams of snow white, light and flocculent eupolyoxymethylene precipitated out which in turn was removed by suction, washed and dried in the air.

We claim:

1. A process for the production of eupolyoxymethylenes of high heat stability which consists of polymerizing water free monomeric formaldehyde in the presence of a sulfur compound of the formula $$Y-\overset{\overset{\text{S}}{\|}}{C}-X$$

in which X is a radical selected from the group consisting of

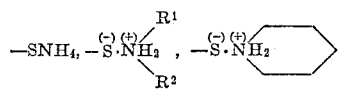

and

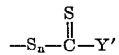

in which $n$ is an integer of 1 to 4 and Y and Y' are nitrogen containing radicals selected from the group consisting of

and

in which $R^1$ and $R^2$ are selected from the group consisting of methyl, ethyl, cyclohexyl and phenyl and $R^3$ is an alkylene radical of up to 5 carbon atoms as the sole polymerization catalyst, said sulfur compound being suspended in the form of extremely fine particles in an inert liquid selected from the group consisting of gasoline and ethylene trichloride in a quantity of 0.01 to 0.03% by weight of said inert liquid.

2. A process as in claim 1 in which the said polymerization is conducted in the presence of molecular oxygen.

3. A process for the production of eupolyoxymethylenes having high heat stability which consists of polymerizing water free monomeric formaldehyde in the presence of a sulfur compound selected from the group consisting of thiuram disulfide, tetramethylthiuram disulfide, tetramethylthiuram tetrasulfide, dipentamethylenethiuram tetrasulfide, dimethyl diphenyl thiuram disulfide, cyclohexylethyl ammonium-cyclohexylethyl dithiocarbamate, the piperidine salt of pentamethylene dithiocarbamic acid, ammonium dithiocarbamate and tetramethylthiuram monosulfide as the sole polymerization catalyst, said sulfur compound being suspended in the form of extremely fine particles in an inert liquid selected from the group consisting of gasoline and ethylene trichloride in a quantity of 0.01 to 0.03% by weight of said inert liquid.

4. A process for the production of eupolyoxymethylenes of high heat stability which consists of polymerizing water free monomeric formaldehyde in the presence of a sulfur compound of the formula

in which X is a radical selected from the group consisting of

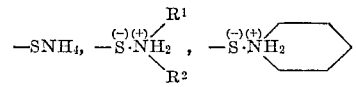

and

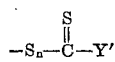

in which $n$ is an integer of 1 to 4 and Y and Y' are nitrogen containing radicals selected from the group consisting of

and

in which $R^1$ and $R^2$ are selected from the group consisting of methyl, ethyl, cyclohexyl and phenyl and $R^3$ is an alkylene radical of up to 5 carbon atoms as the sole polymerization catalyst, said sulfur compound being suspended in the form of extremely fine particles in gasoline in a quantity of 0.01 to 0.03% by weight of said gasoline.

5. A process as in claim 4 in which the said gasoline has a boiling range of 100° C. to 140° C.

6. A process as in claim 4 in which the said inert liquid is saturated with the said monomeric formaldehyde prior to the addition of the said sulfur compound.

References Cited by the Examiner

UNITED STATES PATENTS 2,768,994  10/1956  MacDonald _____ 260—67

OTHER REFERENCES

Walker: Formaldehyde, ACS Monograph Series No. 120, 2nd ed., 1953, Reinhold Publishing Corp., N.Y., p. 116.

WILLIAM H. SHORT, *Primary Examiner.*

LOUISE P. QUAST, *Examiner.*